United States Patent [19]

Uuskallio

[11] Patent Number: 4,823,752
[45] Date of Patent: Apr. 25, 1989

[54] ENGINE SPEED CONTROL CABLE CLAMP

[75] Inventor: Arvo F. Uuskallio, Hartland, Wis.

[73] Assignee: Briggs & Stratton Corporation, Wauwatosa, Wis.

[21] Appl. No.: 159,380

[22] Filed: Feb. 23, 1988

[51] Int. Cl.[4] .............................................. F16C 1/06
[52] U.S. Cl. ..................... 123/400; 123/366; 123/376; 248/67.5; 248/74.1; 248/74.4; 248/316.6; 74/502.4; 74/502.6
[58] Field of Search .............. 123/400, 366, 376; 24/135 N, 458, 532, 573; 74/501 D, 501 F, 501 P; 248/67.5, 74.1, 74.4, 316.6; 242/125.1; 292/256, 306; 14/22; 72/293; 403/DIG. 9, 397

[56] References Cited

U.S. PATENT DOCUMENTS

| 1,776,343 | 9/1930 | Allyn | 248/74.4 |
|---|---|---|---|
| 1,809,774 | 6/1931 | Coates | 248/74.4 |
| 1,877,781 | 9/1932 | Alerlund | 248/74.4 |
| 2,007,431 | 7/1935 | Malcom | 24/573 |
| 2,063,827 | 12/1936 | Placre | 24/573 |
| 2,141,222 | 12/1938 | Pioch | 248/74.4 |
| 2,880,949 | 4/1959 | Fuss | 248/74.4 |
| 2,904,293 | 9/1959 | Thompson | 248/74.1 |
| 3,054,586 | 9/1962 | Kirkup | 248/74.1 |
| 3,150,539 | 9/1964 | Wallis, Jr. | 248/74.1 |
| 3,232,569 | 2/1966 | Deardorf | 248/74.1 |
| 3,263,520 | 8/1966 | Tschaore | 74/501 D |
| 3,263,948 | 8/1966 | Conrad | 74/501 P |
| 3,263,949 | 8/1966 | Conrad | 74/501 D |
| 3,514,279 | 10/1970 | Fledeher et al. | 248/74.1 |
| 3,546,962 | 12/1970 | Ruhala | 74/501 D |
| 3,710,645 | 1/1973 | Bennett | 74/501 D |
| 4,043,528 | 8/1977 | Bedditeia | 248/316.6 |
| 4,170,995 | 10/1979 | Levine et al. | 248/74.1 |
| 4,185,515 | 1/1980 | Webb | 74/501 D |
| 4,294,133 | 10/1981 | Hurley | 74/501 P |
| 4,455,716 | 6/1984 | Leonardo | 248/74.1 |
| 4,524,741 | 6/1985 | Corbi | 123/400 |

FOREIGN PATENT DOCUMENTS 320872 5/1920 Fed. Rep. of Germany ..... 248/74.1
0171487 11/1934 Fed. Rep. of Germany .

Primary Examiner—Raymond A. Nelli
Attorney, Agent, or Firm—Andrus, Sceales, Starke & Sawall

[57] ABSTRACT

A clamp for fixedly mounting the lower end of a remote speed control cable that controls the speed of a small internal combustion engine. The clamp includes a flat base plate having a first fastener receiving opening formed therethrough, a clamp plate spaced from the base plate including an upper flat body portion having a second fastener receiving opening formed therethrough disposed in alignment with the first fastener receiving opening and a lower arcuate cable receiving portion, and a deformable link member connecting the upper ends of the base plate and clamp plate. The link member is collapsible upon movement of the clamp plate toward the base plate by a fastener to permit clamping of a cable casing between the arcuate portion and the base plate.

12 Claims, 1 Drawing Sheet

U.S. Patent  Apr. 25, 1989  4,823,752
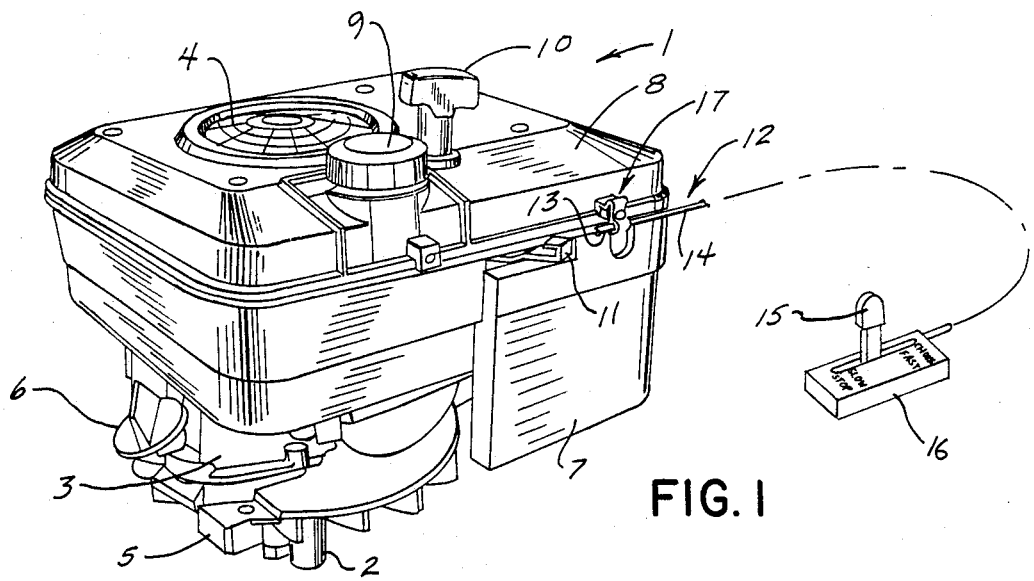
FIG. 1
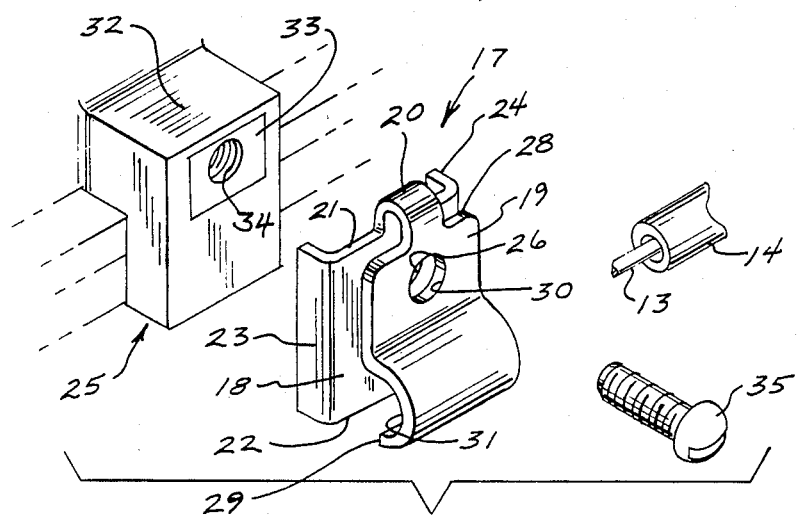
FIG. 2
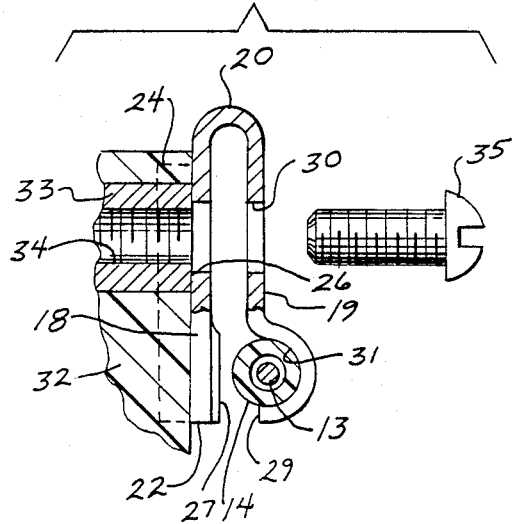
FIG. 3
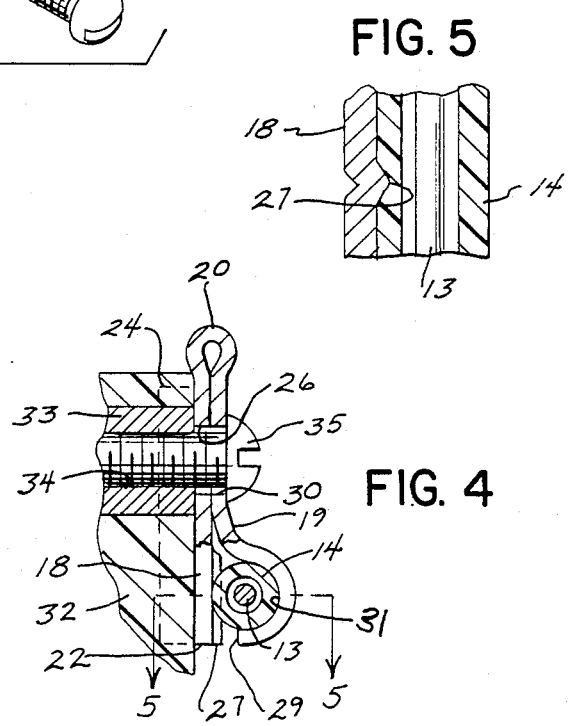
FIG. 4
FIG. 5

ENGINE SPEED CONTROL CABLE CLAMP

BACKGROUND OF THE INVENTION

The present invention relates to internal combustion engines, and more particularly to a clamp for fixedly mounting on the engine a remote control cable that controls the speed of the engine.

The speed of small internal combustion engines employed with lawn and garden equipment, such as lawn mowers, is typically controlled by a remote speed control cable having its upper end connected to a remote speed control lever movable by an operator and its lower end connected to an engine speed control lever on the engine. Such remote speed control cables generally employ a control wire slidably contained in a surrounding casing. The casing may be metal, plastic and/or combinations thereof depending upon the particular application.

In the past, the lower end of the speed control cable was attached to the engine by first inserting the control wire into a hole in the end of the engine speed control lever and then mounting the end of the cable casing to the engine with a casing clamp. Typically, this casing clamp was a metal C-shaped member having an opening formed through its web portion for receiving a screw that was threaded into a tapped bore on an engine component. Thus, as the screw was tightened, the casing clamp would merely sandwich the speed control cable between the web portion of the C-shaped clamp and the engine block. Such clamps were oftentimes over-tightened during assembly, which crushed the cable jacket or casing, thus preventing sliding of the cable wire within the jacket.

Another type of casing clamp utilized a metal block having a semi-circular shaped cable receiving slot formed along its inner surface. This clamp also utilized a screw extending through the metal block to attach the cable to a plastic fuel tank by sandwiching the cable against the side of the fuel tank. Typically, this casing clamp was utilized with plastic cable jackets or casings to prevent crushing of the casing or jacket. However, since the cable casing is plastic and the fuel tank is plastic, this type of clamp necessitated the use of a metal plate positioned between the cable and fuel tank, resulting in a three-part clamp, namely, the metal block, the metal plate and the screw. Such clamps involved assembly problems due to the need to quickly and properly position the three components of the clamp during assembly.

SUMMARY OF THE INVENTION

A clamp for fixedly mounting on an internal combustion engine the casing of one end of a remote speed control cable that controls the speed of the engine.

The clamp includes a flat base plate having a first fastener-receiving opening formed therethrough; a clamp plate spaced from said base plate including a flat body portion having a second fastener-receiving opening formed therethrough disposed in alignment with said first fastener-receiving opening and an arcuate cable-receiving portion; and a deformable link member connecting said base plate and clamp plate. The link member is collapsible upon movement of said clamp plate toward said base plate by a fastener to permit clamping of a cable between said arcuate portion and said base plate.

In a preferred form, the link member extends between the upper edges of the base plate and clamp plate, and is dimensioned to have a width less than one half the width of the plates. Additionally, the base plate may include a detent projecting from its cable engaging surface disposed transversely with respect to the fastener receiving opening in the base plate. The detent aids in positively holding of the casing, yet does not cut through or crush the cable casing.

The present invention thus provides a low cost clamp that positively holds the cable casing which is faster and easier to assemble than prior casing clamps. The clamp may be used on plastic, metal or combination plastic/metal cable casings, will accept a variety or range of cable casing outer diameters, and avoids crushing or cutting through the cable casing. Additionally, the present clamp provides fewer components for assembly while advantageously maintaining the requirements for installation adjustability, easy serviceability and economical replacement.

BRIEF DESCRIPTION OF THE DRAWINGS

The drawings illustrate the best mode presently contemplated of carrying out the invention.

In the drawings:

FIG. 1 is a perspective view of an internal combustion engine incorporating an engine speed control cable casing clamp constructed in accordance with the principals of the present invention;

FIG. 2 is an exploded perspective view illustrating the components of the casing clamp of FIG. 1;

FIG. 3 is a cross sectional view illustrating the components of the casing clamp of FIG. 1 in their pre-assembled condition prior to clamping;

FIG. 4 is a cross-sectional view similar to FIG. 3 illustrating the components of the casing clamp in their assembled condition and after clamping; and FIG. 5 is a fragmentary enlarged cross-sectional view taken along the plane of the line 5—5 in FIG. 4.

DESCRIPTION OF THE PREFERRED EMBODIMENT

Referring now to the drawings, FIG. 1 illustrates a small internal combustion engine, generally designated by the numeral 1, for use in connection with lawn and garden equipment, such as lawn mowers. Engine 1 is of the vertical shaft type and includes a crankshaft 2 connected to a piston (not shown) within cylinder 3, and a rotating air filtering screen 4. Oil for cylinder 3 is contained within oil sump 5 which may be filled via removal of an oil fill cap 6. Engine 1 also includes an air cleaner 7, a fuel tank 8 that may be filled via a fuel fill cap 9, and an optional handle 10 connected to a vertical pull starter rope (not shown). Fuel tank 8 is composed of a plastic material which reduces the overall weight of engine 1. Engine 1 also includes an engine speed control lever 11 which is pivotally mounted on engine 1 having one end projecting from engine 1 between air cleaner 7 and fuel tank 8, and its other end operatively connected to the carburetor of engine 1 for controlling the speed of engine 1.

A remote speed control cable 12 is typically used with lawn and garden equipment such as lawn mowers to control the speed of engine 1 by pivoting or moving engine speed control lever 11. Cable 12 defines a longitudinal axis and includes a metal control wire 13 slidably mounted within a surrounding plastic casing or jacket 14. As shown best in FIG. 1, one end or upper end of control wire 13 is connected to a remote speed control lever 15, which is pivotally mounted within a speed control box 16. Speed control box 16 is typically mounted on the handle assembly of a lawn mower for manual movement of lever 15 by an operator. The other end or lower end of the control wire 13 is connected to the projecting end of speed control lever 11. Cable casing 14, in turn, has its upper end connected to control box 16 and its lower end fixedly mounted on engine 1 by a casing clamp 17. Thus, movement of control wire 13 by an operator pivoting remote speed control lever 15 results in movement of engine speed control lever 11 which, in turn, controls the speed of engine 1.

Turning now to FIGS. 2-4, there is illustrated in more detail the components of casing clamp 17. Casing clamp 17 includes a flat base plate or member 18, a clamp plate 19 spaced outwardly from base plate 18, and a deformable link member 20 connecting base plate 18 and clamp plate 19. Base plate 18 includes an upper portion having an upper edge 21 and a lower portion having a lower edge 22. The upper and lower portions of plate 18 include a pair of inwardly directed flanges 23, 24 disposed along opposite side edges thereof. Flanges 23, 24 prevent axial movement of clamp 17 with respect to the longitudinal axis of control cable 12, and also prevent rotational movement of clamp 17 by straddling the sides of a mounting bracket 25 integrally formed on the side of plastic fuel tank 8 on engine 1 for receiving and removably mounting the clamp 17 thereon, as will hereinafter be described. The upper portion of base plate 18 also includes a fastener receiving opening 26 formed therethrough.

The lower portion of base plate 18 includes an outer cable engaging surface having a detent 27 projecting therefrom. Detent 27 is disposed longitudinally in a direction transverse with respect to the fastener receiving opening 26, and projects from the flat cable engaging surface of base plate 18 a distance that is less than one half the diameter of cable casing 14, and preferably about one tenth the diameter of casing 14. As illustrated, the height of detent 27 is about 0.010 inches–0.020 inches from the surface of base plate 18. The above dimensions insure that detent 27 "bites" into and tightly engages casing 14 of cable 12, but does not cut into casing 14. Typically, the outer diameter of cable 12 varies from a minimum of about 0.185 inches to a maximum of about 0.230 inches.

Clamp plate 19 is spaced from base plate 18 and disposed generally parallel thereto. Clamp plate 19 includes an upper flat body portion having an upper edge 28 and a lower arcuate cable receiving portion having a lower edge 29. The upper portion of plate 19 is disposed opposite the upper portion of plate 18 and includes a second fastener receiving opening 30 formed therethrough disposed in alignment with the fastener receiving opening 26 of base plate 18. The lower arcuate shaped cable receiving portion of plate 19 defines a semicircular tubular shaped cable receiving slot 31 the depth of which is dimensioned to be less than the outer diameter of cable 12. Thus, as shown best in FIG. 3, casing 14 of cable 12 projects inwardly from the plane formed by the inner surfaces of the upper portion of plate 19 and lower edge 29 of plate 19.

Like member 20 interconnects upper edge 21 of base plate 18 and upper edge 28 of clamp plate 19. As shown best in FIG. 3, link 20 is arcuate in shape, and is integrally formed with plates 18 and 19. Upper edges 21 and 28 define a width for their respective plates 18 and 19, and link 20 is dimensioned to have a width less than one half the width of plates 18 and 19. Additionally, plates 18 and 19 and link 20 are typically composed of 0.045 inch thick mild steel so that link 20 is deformable or collapsible upon movement of clamp plate 19 toward base plate 18 by a fastener, as will hereinafter be described, to permit clamping of cable 12 between the lower arcuate portion of clamp plate 19 and detent 27 of base plate 18.

Mounting bracket 5 includes a rectangular shaped boss 32 projecting from a side of fuel tank 8. Boss 32 may be integrally molded with fuel tank 8 and includes opposite sides for snugly receiving flanges 23, 24 projecting inwardly from the upper portion of base plate 18. The central portion of boss 32 also includes a metal insert 33 integrally formed therein which includes a tapped bore 34 for receiving a threaded fastener 35. As shown best in FIG. 2, threaded fastener 35 is typically a machine screw, but any suitable fastener may be used depending upon the particular application.

In order to fixedly mount casing 14 of cable 12 on engine 1, control wire 13 is first inserted into a hole in the projecting end of engine speed control lever 11, with engine speed control lever 11 and remote speed control lever 15 adjustably positioned for proper operation. Control cable 12 is then positioned within cable receiving slot 31 between plates 18 and 19, as shown in FIG. 3, and screw 35 is inserted through openings 26 and 30 into tapped bore 34 of boss 32. Thereafter, a screwdriver or a pneumatically or hydraulically operated power tool may be utilized to turn down screw 35 into bore 34 until the inner surface of clamp plate 19 engages the outer surface of base plate 18. As this occurs, link 20 deforms and collapses, as shown best in FIG. 4, to permit clamping of cable 12 between the arcuate lower portion of clamp plate 19 and detent 27 of base plate 18. As shown best in FIG. 5, detent 27 "bites" into casing 14, but does not crush or cut casing 14.

In order to remove cable 12 from clamp 17, screw 35 is first turned out (but not removed) sufficiently to permit removal of cable 12 via the opening between lower edges 22 and 29 by applying a light downward hand force to cable 12. Cable 12 may also be reinserted into the clamp with a light upward hand force without removing the clamp screw 35.

A casing clamp has been illustrated and described which provides a simple and reliable method of mounting the casing of the lower end of a remote speed control cable to an engine. Various modifications and/or substitutions may be made to the specific components described herein without departing from the scope of the invention. For example, different materials of construction may be utilized than those specifically described and illustrated herein depending upon the particular application and control cable utilized.

Various modes of carrying out the invention are contemplated as being within the scope of the following claims particularly pointing out and distinctly claiming the subject matter which is regarded as the invention:

1. In an internal combustion engine including an engine speed control lever on the engine and a remote speed control cable for moving said engine speed control lever to control the speed of the engine, said remote speed control cable defining a longitudinal axis and having a control wire connected at one end to a remote speed control lever and at its other end to said engine speed control lever and a casing surrounding said control wire slidably receiving said wire therein, a casing clamp assembly for fixedly mounting said casing on the engine to permit sliding movement of said control wire relative to said casing, said casing clamp assembly comprising:

a casing clamp including a flat base plate having a first fastener-receiving opening formed therethrough, a clamp plate spaced from and parallel to said base plate including a flat body portion having a second fastener-receiving opening formed therethrough disposed in alignment with said first fastener-receiving opening and an arcuate cable-receiving portion, and a non-resilient deformable link member connecting said base plate and clamp plate, said link member collapsible from a first position wherein said plates are spaced from one another to a second position wherein said plates are rigidly fixed with respect to one another upon movement of said clamp plate toward said base plate by a fastener to permit clamping of a cable between said arcuate portion and said base plate;

a fastener insertable through said first and second openings; and mounting means on the engine for receiving said fastener and removably mounting said casing clamp thereon.

2. The clamp assembly of claim 1 wherein said clamp plate includes an edge disposed opposite an edge of said base plate and said link member extends therebetween.

3. The clamp assembly of claim 2 wherein said edges comprise upper edges of said plates.

4. The clamp assembly of claim 3 wherein each of said upper edges define a width for its respective plate and said link member is dimensioned to have a width less than one-half the width of said plates.

5. The clamp assembly of claim 1 wherein said base plate includes a cable-engaging surface and said cable-engaging surface includes a detent projecting therefrom to tightly engage the casing of said speed control cable.

6. The clamp assembly of claim 5 wherein said detent is disposed transversely with respect to said first fastener-receiving opening.

7. A clamp for a remote speed control cable having a casing surrounding a control wire slidably received therein for fixedly mounting the casing to permit sliding movement of the control wire relative to the casing, comprising:

a flat base plate having a first fastener-receiving opening formed therethrough;

a clamp plate spaced from and parallel to said base plate including a flat body portion having a second fastener-receiving opening formed therethrough disposed in alignment with said first fastener-receiving opening and an arcuate cable-receiving portion; and a non-resilient deformable link member connecting said base plate and clamp plate, said link member collapsible from a first position wherein said plates are spaced from one another to a second position wherein said plates are rigidly fixed with respect to one another upon movement of said clamp plate toward said base plate by a fastener to permit clamping of a cable between said arcuate portion and said base plate.

8. The clamp of claim 7 wherein said clamp plate includes an edge disposed opposite an edge of said base plate and said link member extends therebetween.

9. The clamp of claim 8 wherein said edges comprise upper edges of said plates.

10. The clamp of claim 9 wherein each of said upper edges define a width for its respective plate and said link member is dimensioned to have a width less than one-half the width of said plates.

11. The clamp of claim 7 wherein said base plate includes a cable-engaging surface and said cable-engaging surface includes a detent projecting therefrom to tightly engage the casing of said speed control cable.

12. The clamp of claim 11 wherein said detent is disposed transversely with respect to said first fastener-receiving opening.

* * * * *